(12) United States Patent
Murphy

(10) Patent No.: US 9,130,439 B2
(45) Date of Patent: Sep. 8, 2015

(54) METHOD OF FLARING STATOR WINDINGS

(71) Applicant: REMY TECHNOLOGIES, L.L.C., Pendleton, IN (US)

(72) Inventor: James Paul Murphy, Greenfield, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 186 days.

(21) Appl. No.: 13/863,794

(22) Filed: Apr. 16, 2013

(65) Prior Publication Data

US 2014/0304978 A1 Oct. 16, 2014

(51) Int. Cl.
*H02K 15/04* (2006.01)
*H02K 15/00* (2006.01)
*H02K 3/24* (2006.01)

(52) U.S. Cl.
CPC ........ *H02K 15/0435* (2013.01); *H02K 15/0037* (2013.01); *H02K 3/24* (2013.01); *Y10T 29/49009* (2015.01); *Y10T 29/53143* (2015.01)

(58) Field of Classification Search
CPC .............................. H02K 3/345; H02K 15/10
USPC ........ 29/596–598, 732–736; 310/67 R, 68 R, 310/179, 184, 201, 214
See application file for complete search history.

(56) References Cited

U.S. PATENT DOCUMENTS

| | | | | |
|---|---|---|---|---|
| 3,407,470 A * | 10/1968 | Gibbs | ............................. | 29/732 |
| 3,471,917 A * | 10/1969 | Sims | ............................... | 29/732 |
| 3,628,240 A * | 12/1971 | Bender | ............................ | 29/596 |
| 3,892,034 A * | 7/1975 | Arakelov et al. | ............... | 29/596 |
| 4,563,808 A * | 1/1986 | Lender | ............................ | 29/596 |
| 5,525,850 A | 6/1996 | Stinson | | |
| 8,141,232 B2 * | 3/2012 | Takada et al. | ................... | 29/596 |
| 8,918,986 B2 * | 12/2014 | Guercioni | ........................ | 29/596 |
| 2014/0304978 A1 * | 10/2014 | Murphy | ............................ | 29/596 |

* cited by examiner

*Primary Examiner* — Minh Trinh
(74) *Attorney, Agent, or Firm* — Cantor Colburn LLP

(57) ABSTRACT

A method of flaring stator windings includes supporting a first axial end of a stator core having first and second end turn portions on a first cuff having a first central opening. The first end turn portion extends through the first central opening. The method further includes positioning a second cuff having a second central opening upon a second axial end of the stator core with the second end turn portion extending through the second central opening, positioning a flaring guide having an angled surface upon the second cuff about the second end turn portion, aligning a flaring portion of a flare tool with the second end turn portion, urging the flaring portion between first and second stator winding layers forming the second end turn portion, and flaring the second stator winding layer radially outward of the stator core.

5 Claims, 6 Drawing Sheets

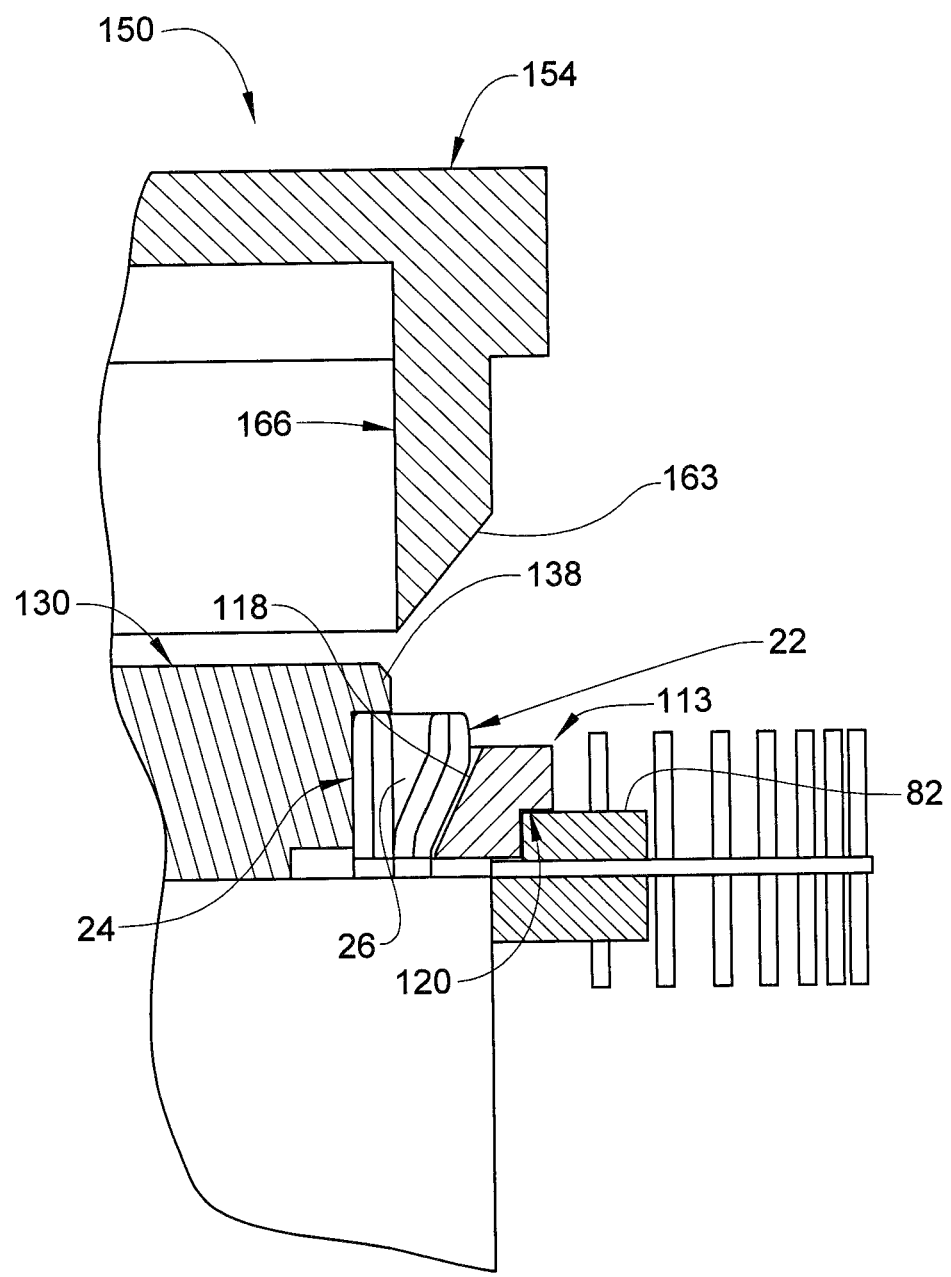

METHOD OF FLARING STATOR WINDINGS

BACKGROUND OF THE INVENTION

Exemplary embodiments pertain to the art of electric machines and, more particularly, to a flaring system for flaring stator windings.

Electric machines typically include a stationary member, or stator, that establishes a stationary field, and a rotating member, or rotor, that moves within the stationary field. In operation, electric machines produce work from electrical energy passing through a stator to induce an electro-motive force in the rotor. The electro-motive force creates a rotational force at the rotor. The rotation of the rotor is used to power various external devices. Of course, electric machines can also be employed to produce electricity from a work input. In either case, electric machines currently produce greater outputs at higher speeds and are designed to fit into smaller packages.

The electrical energy flowing through the stator and the rotor creates heat. It is desirable to remove the heat from the electric machine to enhance operating efficiency. In some cases, manufacturers are creating spaces between end turn layers to promote cooling. The spaces are generally created by flaring one or more end turn layers axially outward from others of the end turn layers. The spaces provide access for coolant to pass in a heat exchange relationship with the end turn layers to reduce stator temperatures.

BRIEF DESCRIPTION OF THE INVENTION

Disclosed is a flaring system for stator windings including a base member, and a first cuff supported at the base member. The first cuff includes a first body having an outer annular surface and an inner annular surface that defines a first central opening. The body is configured and disposed to support a first axial end of a stator core with a first end turn portion of the stator core extending through the central opening. A second cuff includes a second body having an outer annular surface and an inner annular surface that defines a second central opening that is configured and disposed to register with the first central opening. The second body is configured and disposed to support a second axial end of a stator core with a second end turn portion of the stator core extending through the second central opening. A flaring guide includes an angled surface configured and disposed to rest upon the second body. A flare tool includes a flaring portion having an angled surface portion. The flaring portion is configured and disposed to extend between first and second stator winding layers of the second end turn portion with the angled surface portion urging one of the first and second stator winding layers radially outward against the angled surface of the flaring guide.

Also disclosed is a method of flaring stator windings. The method includes supporting a first axial end of a stator core having first and second end turn portions on a first cuff having a first central opening. The first end turn portion extends through the first central opening. The method also includes positioning a second cuff having a second central opening upon a second axial end of the stator core with the second end turn portion extending through the second central opening. A flaring guide having an angled surface is positioned upon the second cuff about the second end turn portion. A flaring portion of a flare tool is aligned with the second end turn portion. The flaring portion is urged between first and second stator winding layers forming the second end turn portion. The second stator winding layer is flared radially outward of the stator core.

Further disclosed is a flaring system for stator windings including a base member and a first cuff supported at the base member. The first cuff includes a first body having an outer annular surface and an inner annular surface that defines a first central opening. A stator assembly includes a stator core including first and second axial ends, with the first axial end including a first end turn portion and the second axial end including a second end turn portion having first and second stator winding layers. The first axial end being supported at the first cuff with the first end turn portion extending through the first central opening. The second cuff includes a second body having an outer annular surface and an inner annular surface that defines a second central opening. The second cuff supports the second axial end of the stator core with the second end turn portion extending through the second central opening. A flaring guide includes an angled surface and is configured and disposed to rest upon the second body. A flare tool includes a flaring portion having an angled surface portion. The flaring portion is configured and disposed to extend between the first and second stator winding layers of the second end turn portion with the angled surface urging one of the first and second stator winding layers radially outward against the angled surface of the flaring guide.

BRIEF DESCRIPTION OF THE DRAWINGS

The following descriptions should not be considered limiting in any way. With reference to the accompanying drawings, like elements are numbered alike:

FIG. 6 depicts a partial cross-sectional view of the flaring system of FIG. 5.

DETAILED DESCRIPTION OF THE INVENTION

A detailed description of one or more embodiments of the disclosed apparatus and method are presented herein by way of exemplification and not limitation with reference to the Figures.

Figure 1:
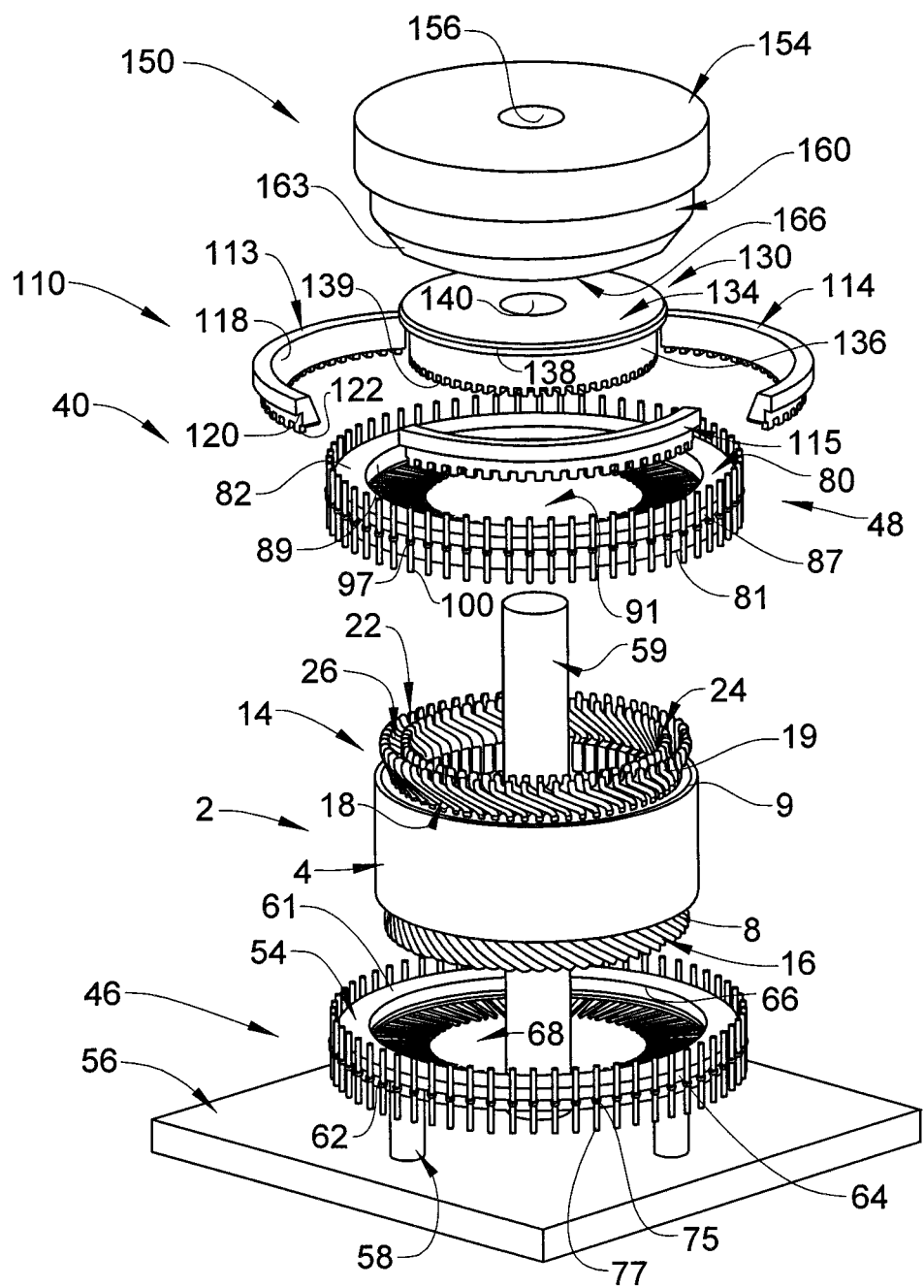
FIG. 1 depicts an exploded view of the flaring system in accordance with an exemplary embodiment.

A stator for an electric machine is indicated generally at 2 in FIG. 1. Stator 2 includes a stator core 4 having a first axial end 8 and an opposing, second axial end 9. Stator 2 also includes a plurality of stator windings 14 supported by stator core 4. Stator windings 14 include a first end turn portion 16 extending beyond first axial end 8 and a second end turn portion 18 extending beyond second axial end 9. Second end turn portion 18 defines a weld end 19 of stator windings 14. Stator windings 14 include a first stator winding layer 22 arranged radially outwardly of a second stator winding layer 24. The number of stator winding layers may vary. In order to promote cooling of stator windings 14 particularly at weld end 19, first stator winding layer 22 is flared radially outwardly creating a gap 26. Gap 26 provides a passage (not separately labeled) that allows coolant to flow between first and second stator winding layers 22 and 24 to promote cooling of weld end 19.

In accordance with an exemplary embodiment, first stator winding layer 22 is flared radially outwardly by a flaring system 40. Flaring system 40 includes a first cuff 46 and a second cuff 48 that support and positions stator 2, as will become more fully evident below. First cuff 46 includes a first body 54 which, in the exemplary embodiment shown, is supported above a base member 56 by a plurality of supports, one of which is indicated at 58. In addition to supports 58, flaring system 40 includes a central tool support 59 that, in the exemplary embodiment shown, projects substantially perpendicularly from base member 56.

First body 54 includes first and second surfaces 61 and 62 joined by an outer annular surface 64 and an inner annular surface 66. Inner annular surface 66 defines a first central opening 68. First body 54 includes a plurality of openings (not separately labeled) that extend from outer annular surface 64 to inner annular surface 66. Each of the plurality of openings receives a corresponding one of a plurality of finger elements such as shown at 75. Each finger element 75 includes a corresponding stop element 77. Stop element 77 limits radially inward insertion of finger element 75. With this arrangement, finger elements 75 are initially in a radially outward position (not shown). First axial end 8 of stator core 4 is passed into first central opening 68 and finger elements 75 are passed through first end turn portion 16 to support stator 2 at first cuff 46.

Second cuff 48 includes a second body 80 having a first surface 81 and an opposing, second surface 82 joined by an outer annular surface 87 and an inner annular surface 89. Inner annular surface 89 defines a second central opening 91. In a manner similar to that described above, second body 80 includes a plurality of openings (not separately labeled) that extend from outer annular surface 87 to inner annular surface 89. Each of the plurality of openings receives a corresponding one of a plurality of finger elements, such as shown at 97. Each finger element 97 includes a stop element 100. Stop element 100 limits radially inward insertion of finger element 97. With this arrangement, finger elements 97 are initially in a radially outward position (not shown). Second cuff 48 is placed over second axial end 9 of stator core 4 with second end turn portion 18 passing through second central opening 91. At this point, finger elements 97 are passed through second end turn portion 18 to second cuff 48 at second axial end 9 of stator core 4.

Flaring system 40 also includes a flaring guide 110 that establishes a desired flare angle of first stator winding layer 22. Flaring guide 110 includes a first flaring guide segment 113, a second flaring guide segment 114, and a third flaring guide segment 115. The use of multiple flaring guide segments 113-115 facilitates removal of flaring guide 110 when flaring is complete as will be detailed more fully below. As each flaring guide segment 113-115 includes substantially similar structure, a detailed description will follow with reference to flaring guide segment 113 with an understanding that flaring guide segments 114 and 115 include similar structure. Flaring guide segment 113 includes an inner, curvilinear angled surface 118 having an angle that establishes the desired flare angle of first stator winding layer 22. Flaring guide segment 113 also includes a support surface 120 that is configured to abut, or rest upon, second surface 82 of second cuff 48 and a plurality of locating tabs 122. Locating tabs 122 interact with finger elements 97 to prevent movement of flaring guide segment 113 relative to second cuff 48.

Flaring system 40 is further shown to include a center plug 130 that provides support and protection for second stator winding layer 24. Center plug 130 includes a plug body 134 having an outer annular surface portion 136 terminating in an overhanging outer annular edge 138. Outer annular surface portion 136 is configured to nest within second end turn portion 18 with outer annular edge 138 covering an outer edge portion (not separately labeled) of second stator winding layer 24. Center plug 130 also includes a plurality of locating tab elements 139 arranged at a terminal end (also not separately labeled) of outer annular surface portion 136 opposite to outer annular edge 138. In a manner similar to that described above, locating tab elements 139 interact with finger elements 97 to prevent movement of center plug 130 relative to second cuff 48. Center plug 130 also includes a central passage 140 that extends axially through plug body 134. Central passage 140 is configured to receive central tool support 59 to establish a desired alignment of center plug 130 and stator core 4.

In further accordance with the exemplary embodiment, flaring system 40 includes a flare tool 150 that acts upon first stator winding layer 22 to establish the desired flare angle. Flare tool 150 includes a flare tool body 154 having a central passage 156 that is configured to receive central tool support 59. Central tool support 59 establishes a desired alignment of flare tool 150 relative to stator core 4, as well as an axial guide path that leads flare tool 150 into contact with first stator winding layer 22. Flare tool 150 also includes a flaring portion 160 that includes an annular angled surface portion 163 and a central recess 166. Annular angled surface portion 163 includes an angle that may be substantially similar to the angle of curvilinear angled surface 118. It should however be understood that the angles may differ.

Figure 2:
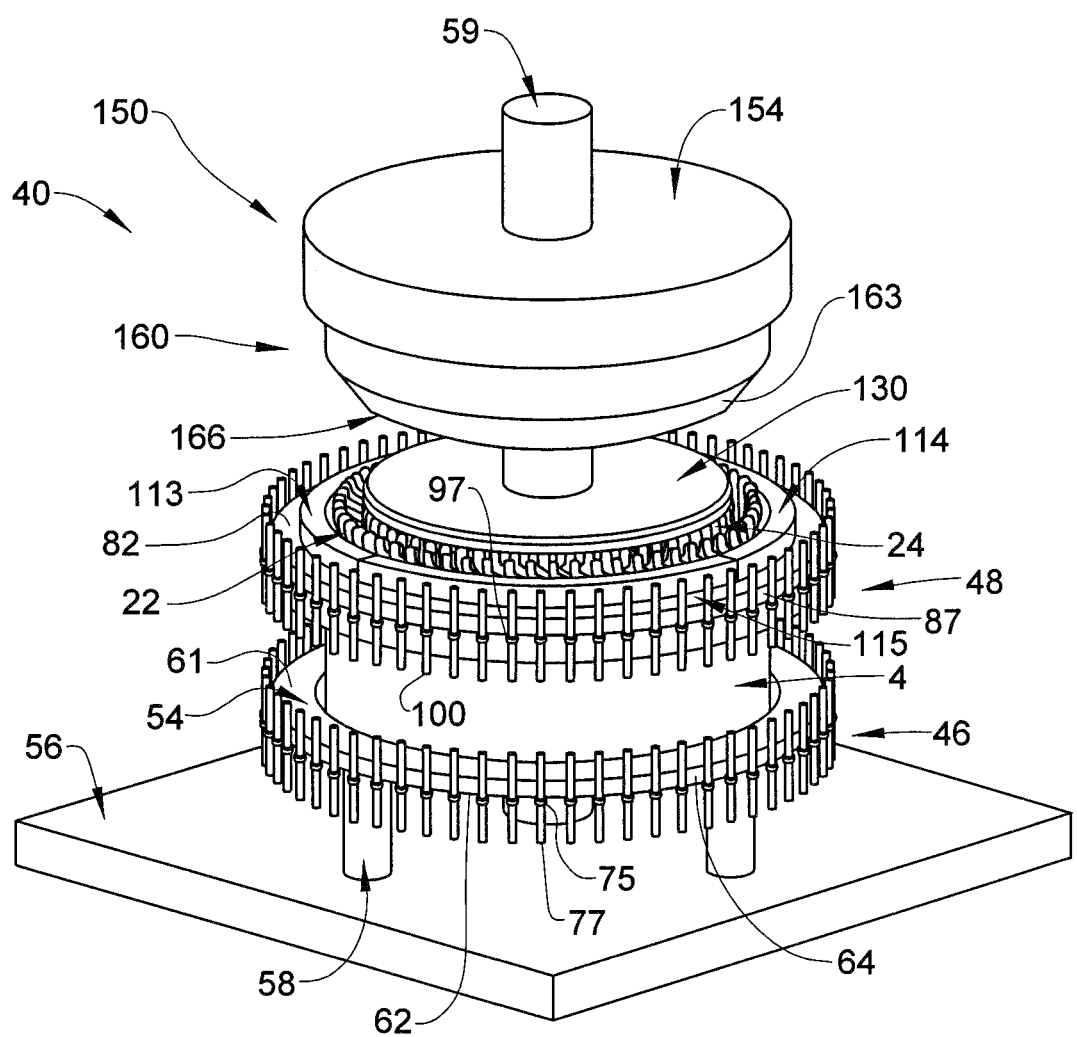
FIG. 2 depicts the flaring system of FIG. 2 positioned about a stator.
Figure 3:
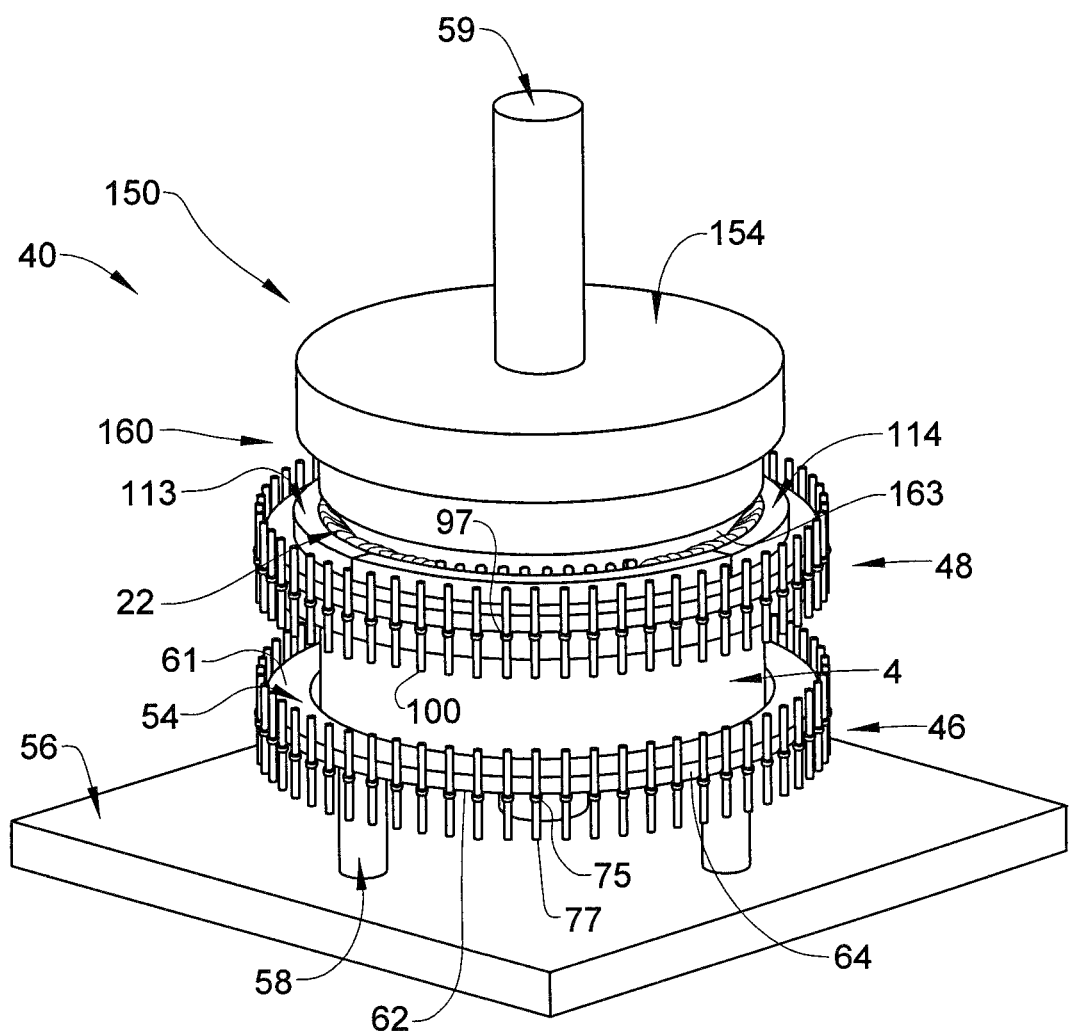
FIG. 3 depicts a flaring tool of the flaring system acting upon stator windings of the stator.
Figure 4:
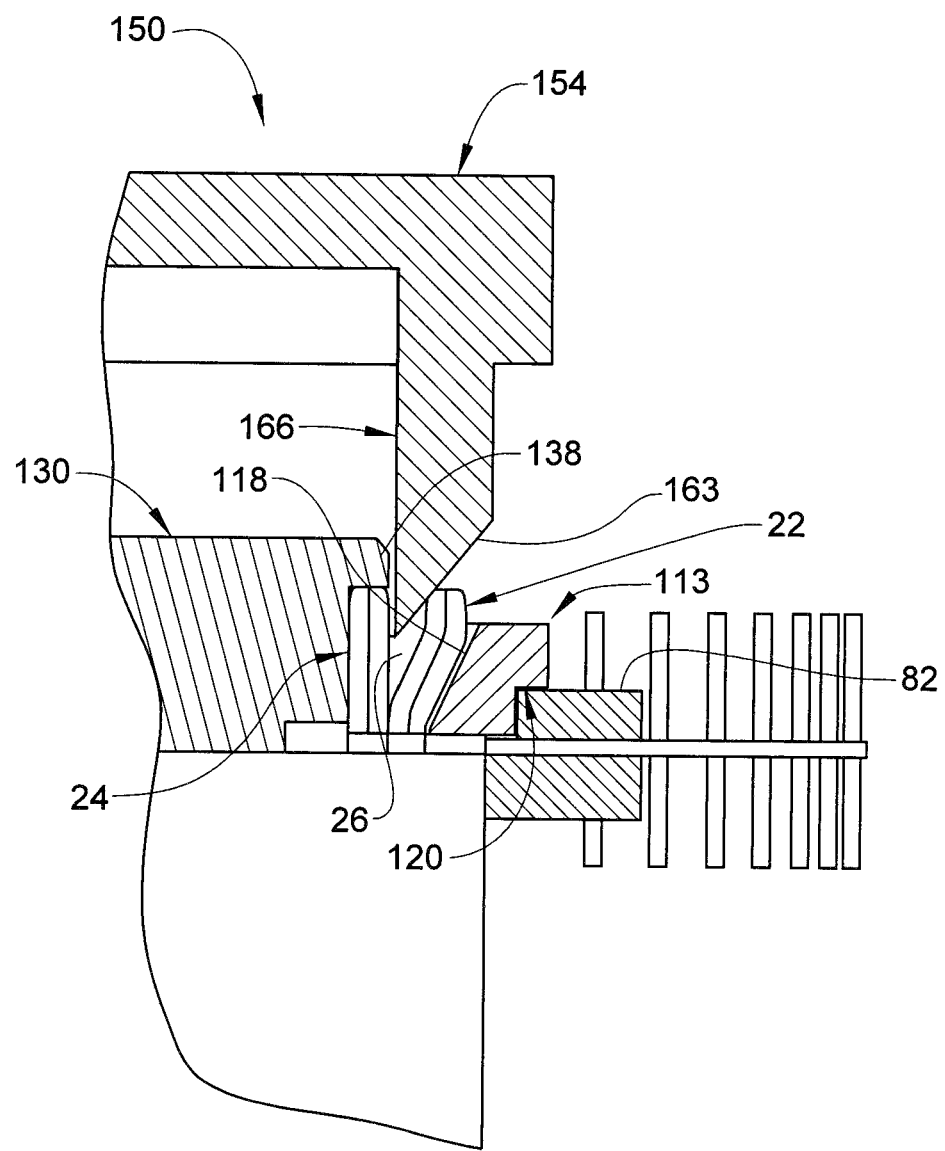
FIG. 4 depicts a partial cross-sectional view of the flaring system of FIG. 3.

In accordance with an exemplary embodiment, after securing first and second cuffs 46 and 48, positioning flaring guide segments 113-115 and center plug 130 as shown in FIG. 2, flare tool 150 is guided over central tool support 59. Flare tool 150 is urged into contact with second end turn portion 18. More specifically, flare tool 150 is guided into contact with second end turn portion 18 causing flaring portion 160 to pass into gap 26. Continued axial movement of flare tool 150 causes annular angled surface portion 163 to urge first stator winding layer 22 radially outwardly relative to second stator winding layer 24. Flare tool 150 continues to move axially over central tool support 59 such that center plug 130 is received in central recess 166 and first stator winding layer 22 is forced against curvilinear angled surface 118 of each flaring guide segment 113, as shown in FIGS. 3 and 4, creating the desired flare.

Figure 5:
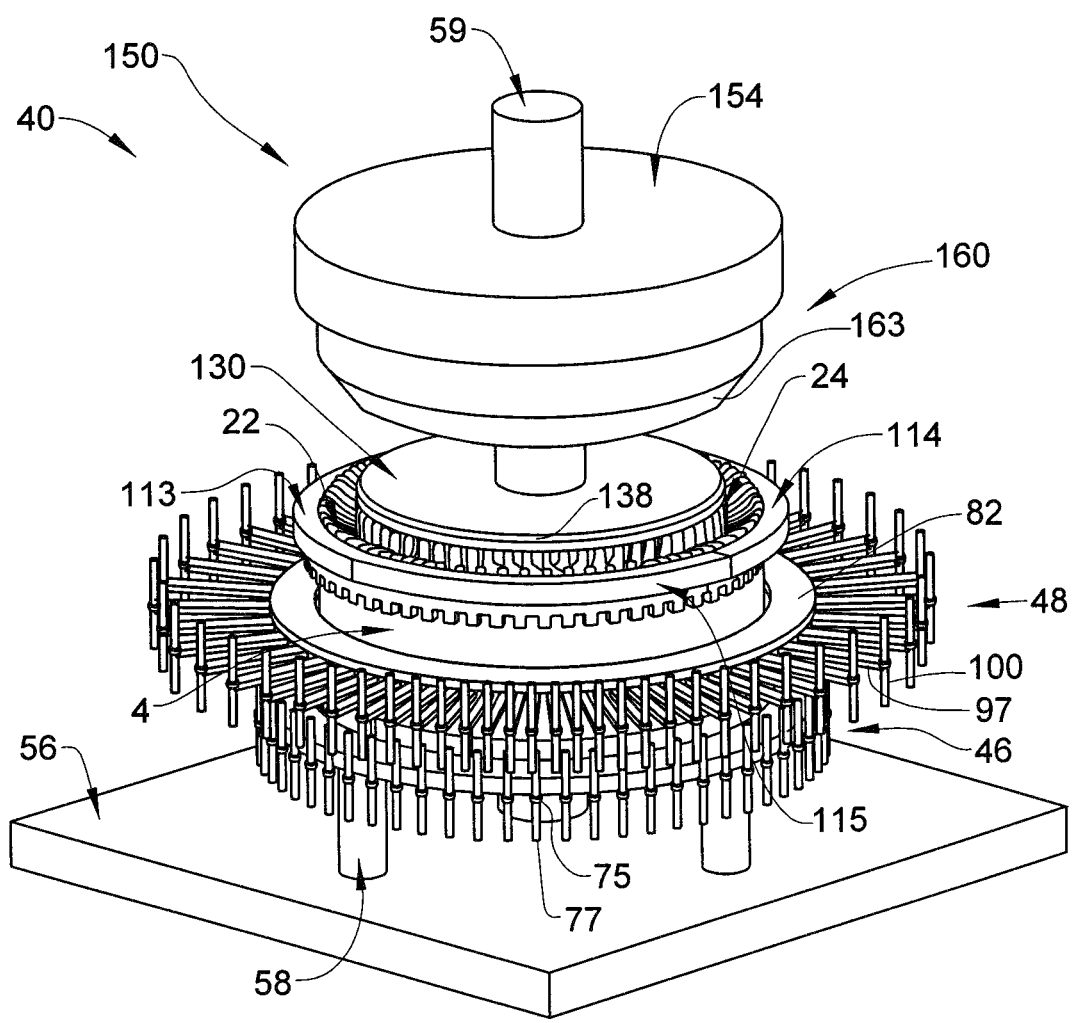
FIG. 5 depicts the flaring system being removed from the stator following a flaring operation.

After creating the desired flare, flare tool 150 is withdrawn, and second cuff 48 is released and shifted toward first cuff 46, as shown in FIGS. 5 and 6. Second cuff 48 is released by withdrawing finger elements 97. Additional release can be achieved by removing a stop (not shown) that helps position second cuff 48 on stator core 4. Once second cuff 48 is moved toward first cuff 46, flare guide segments 113-115 may be removed. Center plug 130 may also be removed and stator 2 released from first cuff 46. Upon removal, stator 2 may be incorporated into an electric machine (not shown).

At this point it should be understood that the exemplary embodiments describe a tool that is designed to flare one or more stator winding layers relative to one or more other stator winding layers. By flaring the one or more stator winding layers, a wider gap is formed. The wider gap provides increased area for receiving a coolant such that may be in the form of a cooling gas or a cooling fluid. The coolant is guided over the end turn to draw away heat. Providing additional cooling area, particularly at a weld end of stator windings, increases operational efficiencies of the stator.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims.

What is claimed is:

1. A method of flaring stator windings, the method comprising:

supporting a first axial end of a stator core having first and second end turn portions on a first cuff having a first central opening, the first end turn portion extending through the first central opening;

positioning a second cuff having a second central opening upon a second axial end of the stator core with the second end turn portion extending through the second central opening;

positioning a flaring guide having an angled surface upon the second cuff about the second end turn portion;

aligning a flaring portion of a flare tool with the second end turn portion;

urging the flaring portion between first and second stator winding layers forming the second end turn portion; and flaring the second stator winding layer radially outward of the stator core.

2. The method of claim 1, further comprising: positioning a center plug radially inward of the first stator winding layer.

3. The method of claim 2, further comprising: inserting another plurality of finger elements through the second cuff into the second end turn portion to further secure the stator core.

4. The method of claim 1, further comprising: inserting a plurality of finger elements through the first cuff into the first end turn portion to secure the stator core.

5. The method of clam 1, wherein positioning the flaring guide includes arranging multiple flaring guide segments about the second cuff.

* * * * *